US012789880B2

(12) United States Patent
Spour

(10) Patent No.: US 12,789,880 B2
(45) Date of Patent: Nov. 10, 2026

(54) PRAM, FRAME AND METHOD FOR AUTOMATIC ROCKING

(71) Applicant: CYBEX GmbH, Bayreuth (DE)

(72) Inventor: Jiri Spour, Zlatniky-Hodkovice (CZ)

(73) Assignee: CYBEX GmbH, Bayreuth (DE)

( * ) Notice: Subject to any disclaimer, the term of this patent is extended or adjusted under 35 U.S.C. 154(b) by 272 days.

(21) Appl. No.: 18/682,249

(22) PCT Filed: Aug. 4, 2022

(86) PCT No.: PCT/EP2022/071972
§ 371 (c)(1),
(2) Date: Feb. 8, 2024

(87) PCT Pub. No.: WO2023/016922
PCT Pub. Date: Feb. 16, 2023

(65) Prior Publication Data

US 2024/0351627 A1 Oct. 24, 2024

(30) Foreign Application Priority Data

Aug. 10, 2021 (DE) ..................... 10 2021 120 796.7

(51) Int. Cl.
*B62B 9/22* (2006.01)
*B62B 5/00* (2006.01)
*B62B 9/08* (2006.01)

(52) U.S. Cl.
CPC .............. *B62B 9/22* (2013.01); *B62B 5/0069* (2013.01); *B62B 9/087* (2013.01); *B62B 5/005* (2013.01); *B62B 5/0066* (2013.01)

(58) Field of Classification Search
CPC ... B62B 5/0016; B62B 5/0033; B62B 5/0036; B62B 5/004; B62B 5/0043;
(Continued)

(56) References Cited

U.S. PATENT DOCUMENTS 2,988,175 A 6/1961 West
3,820,614 A 6/1974 Askinazy
(Continued)

FOREIGN PATENT DOCUMENTS

DE 102004001015 A1 10/2005
DE 102008039599 A1 3/2010
(Continued)

OTHER PUBLICATIONS

"German Application No. 10 2021 120 796.7, Office Action dated Apr. 21, 2022", (Apr. 21, 2022), 7 pgs.
(Continued)

*Primary Examiner* — Timothy Hannon
(74) *Attorney, Agent, or Firm* — Schwegman Lundberg & Woessner, P.A.

(57) ABSTRACT

A pram with a frame, which has a pusher and wheels for driving the pram, a drive, which is drive-connected to at least one of the wheels, and a braking device for at least one wheel, which is transferable into a driving state with free wheel rotation and into a braked state with at least one braked wheel, wherein the drive can be actuated for an automatic rocking function of the pram, wherein the wheel braked by the braking device is rotatable to a limited extent in both wheel circumferential directions in the braked state for automatic rocking of the pram.

21 Claims, 2 Drawing Sheets

(58) Field of Classification Search
CPC ..... B62B 5/0046; B62B 5/005; B62B 5/0069; B62B 5/0066; B62B 5/0073; B62B 5/0076; B62B 5/0404; B62B 5/0423; B62B 9/08; B62B 9/087; B62B 9/00
See application file for complete search history.

(56) References Cited

U.S. PATENT DOCUMENTS

| | | | |
|---|---|---|---|
| 4,084,663 | A | 4/1978 | Haley |
| 2014/0196991 | A1 | 7/2014 | Fite |

FOREIGN PATENT DOCUMENTS

| | | | |
|---|---|---|---|
| DE | 102019133309 | A1 | 7/2020 |
| EP | 2818382 | A1 | 12/2014 |
| GB | 2563573 | A | 12/2018 |
| WO | WO-2017029603 | A1 | 2/2017 |
| WO | WO-2020076227 | A1 | 4/2020 |
| WO | WO-2023016922 | A1 | 2/2023 |

OTHER PUBLICATIONS

"International Application No. PCT/EP2022/071972, International Search Report and Written Opinion dated Nov. 8, 2022", (Nov. 8, 2022). 19 pgs.

PRAM, FRAME AND METHOD FOR AUTOMATIC ROCKING

PRIORITY CLAIM TO RELATED APPLICATIONS

This application is a U.S. national stage filing under 35 U.S.C. § 371 from International Application No. PCT/EP2022/071972, filed on 4 Aug. 2022, and published as WO2023/016922 on 16 Feb. 2023, which claims the benefit under 35 U.S.C. 119 to German Application No. 10 2021 120 796.7, filed on 10 Aug. 2021, the benefit of priority of each of which is claimed herein, and which applications and publication are hereby incorporated herein by reference in their entirety.

DESCRIPTION

The invention relates to a pram, a frame for a pram and a method for automatic rocking. A pram with the features of the preamble of claim 1 is known, for example, from DE 10 2008 039 599 A1.

In the known pram, a drive is provided which can be switched on for short-time support of the push drive, for the rocking function, and for raising and lowering the seat or cot, whereby the mechanism is described with a view to changing the height position of the seat or cot. These are attached via a rigid belt to the upper parts of two telescopic, spindle-operated arms which connect the upper parts to the chassis of the pram.

Figure 1:
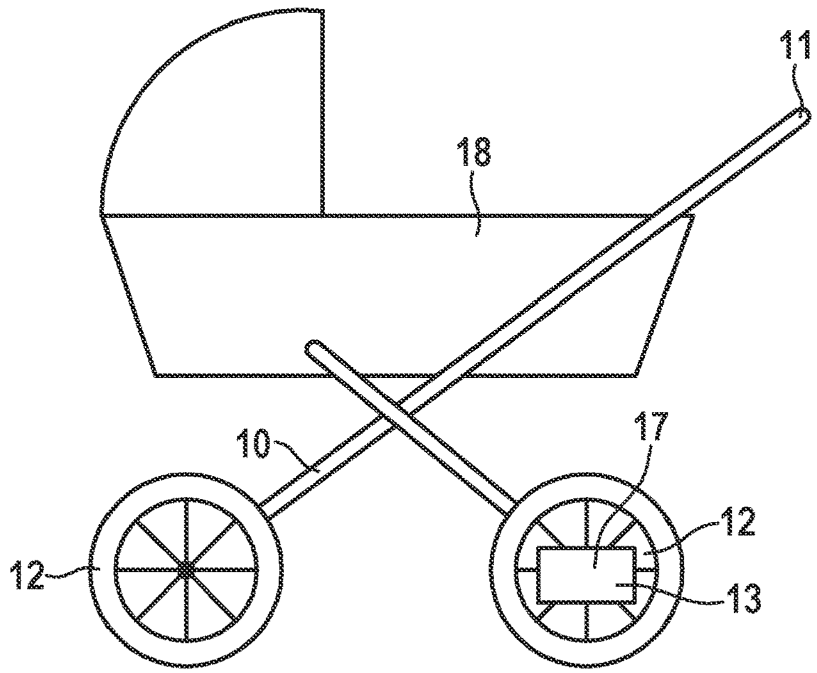
Fig. 1 (prior art)

EP 2 818 382 A1 discloses a further motorised pram which is equipped with a drive to assist in pushing the pram. EP 2 818 382 A1 focusses on the control of the drive in connection with the pushing force. FIG. 1 (prior art) shows the structure of the pram known from EP 2 818 382 A1, which has a frame with wheels, a pram attachment connected to the frame and a pusher for pushing the pram. The drive of the known pram in the lower area of the frame is shown schematically.

It is known from the generic prior art mentioned above to also use the drive provided for the push support to automatically rock the pram. However, with motor-assisted automatic rocking, it is not only important to generate the rocking movement as such, but also that the rocking movement is safe to handle and calms the child lying in the pram attachment or even rocks it to sleep.

The object of the invention is to improve the above-mentioned, known pram in such a way that an automatic rocking function that is as safe and practical as possible is implemented with the aid of the drive, which enables the desired rocking movement of the pram without manual assistance. A further object of the invention is to provide a corresponding frame for a pram as well as a corresponding method for automatically rocking a pram.

According to the invention, this object is solved with regard to the pram by the subject matter of claim 1. With regard to the frame, the object is solved by the subject matter of claim 16 and with regard to the method by the subject matter of claim 17.

Specifically, the object is solved by a pram with a frame which has a pusher and wheels for driving the pram. The pram has a drive which is drive-connected to at least one of the wheels and a braking device for at least one wheel. The braking device is transferable into a driving state with free wheel rotation and into a braked state with at least one braked wheel (possibly several braked wheels). The drive can be actuated for an automatic rocking function of the pram. The (respective) wheel braked by the braking device is rotatable to a limited extent in both wheel circumferential directions in the braked state for automatic rocking.

The invention has the advantage that the rocking typical in practice for calming the child can be simulated by gently moving the pram forwards and backwards. This is achieved by the braking device allowing a partial rotation of the wheels in the braked state. The partial rotation effects that the pram can be moved a limited distance. For this purpose, the wheel braked by the braking device can be rotated to a limited extent in both wheel circumferential directions in the braked state. By the limitation of the rotational movement of the wheels, a movement frame is created in the braked state, which can be utilised by the pram drive for the rocking movement. In this, the partial rotation of the braked wheel is limited in both wheel circumferential directions. By this the simulation of an iterative, reciprocal travelling movement, i.e. the back and forth movement of the pram that is typical in practice, is enabled. At the same time, the safety of the rocking movement is ensured because the braking device is in the braked state during the automatic rocking and prevents a free, unbraked wheel rotation.

Free wheel rotation corresponds to the driving state in which the braking device is completely released so that the wheels can rotate freely. In contrast to that, only a partial rotation of the wheels is possible in the braked state, which allows the limited back and forth movement of the pram required for the rocking movement. The repetitive braking of the pram caused by muscle power during manual rocking is taken over by the braking device. The invention thus provides the prerequisite for an automatic, motor-assisted rocking movement that is oriented to the natural, manual rocking movement.

The invention is applicable to all types of prams that enable rocking by moving the pram back and forth. For example, the invention can be applied to the classic pram shown in FIG. 1 (prior art), to children's strollers, to buggies or similar vehicles which serve to transport babies and small children.

The pram thus preferably has at least three wheels, in particular at least two, preferably exactly two, rear wheels and at least one front wheel, preferably exactly one front wheel or exactly two front wheels. The braking device can allow (driving state) or prevent (braked state) the rotation of at least one of the wheels, preferably of one rear wheel or both rear wheels. Preferably (at least) precisely the (respective) at least one wheel on which the braking device can also engage is driven.

In accordance with embodiments, the frame can also have, whereby the list is not exhaustive:

- at least one rear leg, preferably two rear legs;
- at least one front leg, preferably exactly one or exactly two front legs;
- a mounting unit for mounting a child and/or at least one adapter that allows the detachable attachment of a mounting unit for mounting a child;
- an axle connecting the (two) rear wheels; and/or
- a joint for rotatably connecting at least two frame sections of the frame, wherein preferably at least one, preferably at least two and/or all of the frame sections connected by the joint are selected from:
  - the pusher
  - the at least one rear leg
  - the at least one front leg.

The invention does not (necessarily) depend on the exact configuration of the drive. This means that the change in the direction of force or torque required to reverse the movement can be achieved in different ways. The invention sets the framework for ensuring that the motorised movement cannot take place uncontrollably in one of the two directions of travel or in both directions of travel. According to the invention, the rocking movement is not limited by the drive, but by the braking device, at least primarily limited.

Preferred embodiments of the invention are given in the dependent claims.

Thus, the braking device can comprise a parking brake. In contrast to a deceleration brake, the parking brake completely blocks the braked wheel. This has the advantage that the desired partial rotation in the braked state is permitted between two blocking positions of the wheels. By this the optimum safety against unintentional movement of the pram during automatic rocking is given.

In a further preferred embodiment, the braking device can have several braking positions at different wheel angle positions, each of which enables the limited rotation of the braked wheel in both wheel circumferential directions. This has the advantage that the automatic rocking function is possible in (almost) any wheel position, just as with classic manual rocking.

The braking device and the (respective) wheel preferably have at least one (possibly two) pair(s) of complementary (touching in at least one state) stops (movement stops; stop surfaces) for (mechanically) limiting the rotation of the wheel. The (respective) pair can be formed by: two engagement projections (whereby at least one engagement projection may be formed by a pin); and/or an engagement projection (possibly pin) and an engagement opening (possibly extending along an arc, preferably a circular arc), e.g. engagement opening (in particular engagement through-hole) or engagement recess (in particular engagement blind hole). Expediently, the braking device has at least or exactly one engagement means (e.g. engagement projection) and/or at least or exactly one engagement recess (in particular engagement opening), which interacts/interact with a corresponding engagement recess (in particular engagement opening) or a corresponding engagement means (e.g. engagement projection) of the respective wheel for braking. By this it can be reverted to standard components for the braking function, which can be modified relatively easily for the partial rotation. By way of kinematic reversal, a (respective) engagement means (e.g. engagement projection) and/or a (respective) engagement recess (in particular engagement opening) can be formed on the braking device. Conversely, the wheel can have at least or exactly one engagement opening and/or at least or exactly one engagement means (e.g. engagement projection) (which are correspondingly formed complementary). Typically, the wheel has at least one (possibly the exact one) engagement opening and the braking device has the (at least one) complementary engagement means.

Preferably, an inner circumference and/or a length (extending in the circumferential direction of the wheel) of the (respective) engagement recess (in particular engagement opening) is greater than an outer circumference or a length (extending in the circumferential direction of the wheel) of the engagement means (engagement projection) in order to form a play in the circumferential direction of the wheel. In this embodiment, the play or braking play enables the partial rotation and thus the linear movement of the pram required for rocking.

Preferably, a radial extension of the (respective) engagement recess (in particular engagement opening) is equal to or greater than a radial extension for forming a play in the wheel circumferential direction greater than an outer circumference or a length (extending in the wheel circumferential direction) of the engagement means (engagement projection).

In a specific embodiment, the engagement means can comprise a pin and/or stud and/or the engagement opening can comprise a corresponding pin receptacle or stud receptacle, whereby the pin receptacle has a length that is greater than the pin diameter. Standard components can be used here also, which can be modified by relatively simple manufacturing measures in order to achieve the desired brake play. The pin receptacle can extend longitudinally along a partial circumference of a wheel. This has the advantage that, in the braked state, the pin runs or is guided in the pin receptacle as if in a curved guide groove, the ends of which form the movement stops, i.e. the limits of the play. Several pin receptacles can be arranged distributed around the circumference, allowing several engagement or braking positions.

For each braked wheel, there may be (exactly) one engagement means (in particular engagement projection, e.g. pin) and/or a plurality of (e.g. at least three or at least eight and/or at most 30 or at most 18) engagement recesses (in particular engagement openings).

For each braked wheel, there may be a number N (N is greater than or equal to 1) of engagement means (in particular engagement projections, e.g. pins) and a plurality M of engagement recesses (in particular engagement openings), wherein preferably applies $M \geq 2*N$; optionally $M \geq 5*N$ or $M \geq 10*N$; and/or $M \leq 30*N$.

In embodiments, (at least) one specific engagement means (in particular engagement projection, e.g. pin) can be brought into engagement with at least three or at least eight and/or at most 30 different engagement recesses (in particular engagement openings) (in particular in corresponding different assumable states, whereby in a respective assumed state it preferably applies that the engagement means (in particular engagement projection, e.g. pin) is in engagement with only one engagement recess (in particular engagement opening)).

The drive can have at least one motor, in particular an electric motor, at least one energy source, in particular a battery or accumulator, at least one sensor and/or a control unit. The motor can be arranged on a rear axle of the frame or designed as a hub motor. Expediently, the drive or a part of the drive, in particular comprising the motor and/or the accumulator, is designed as a removable module. Such a removable module can also comprise other components of the pram or frame, such as a wheel.

One or more sensors provided can detect or measure the rotation or an angle of rotation of a wheel, in particular of the braked wheel. Alternatively or additionally, a provided sensor can detect whether the brake is activated. Alternatively or additionally, a sensor provided can detect or measure a motor movement (in particular the rotation of an electric motor).

In a preferred embodiment, the control unit is designed for the analysation of the detected data and the control of the motor. The configuration of the control unit according to the embodiment, which is disclosed and claimed in connection with the pram as part of the device, is additionally described and claimed as a method for automatic rocking. The advantages and details according to the embodiment of the control unit are disclosed and described in connection with the method claims. The statements in the context of the method claims apply equally to the configuration of the control unit and as such are also disclosed and claimed in connection with the control unit, i.e. in the context of the device.

Alternatively or in addition to the pram, a frame, in particular a chassis for a pram (possibly without an attachment for the child to lie on and/or sit on, which can be provided separately if necessary) is disclosed and claimed, which otherwise has the same features according to the invention as claim 1. With regard to the advantages, reference is therefore made to the statements on the pram.

The method according to the invention for automatically rocking a pram with rocking function is characterised in that a braked state of the pram is detected, a rocking distance of the pram is automatically moved back and forth by a drive upon activation of the rocking function, and the beginning and the end of the rocking distance are each limited by the blockade of at least one wheel.

The method according to the invention is preferably, but not exclusively, applicable to the pram according to claim 1. The advantage of the method according to the invention lies in that an increased safety against unintentional movement of the pram during automatic rocking is obtained, since the braking function is superordinate to the rocking function and is extended, but not cancelled, by increased play of the wheels in the circumferential direction. This is achieved in that the start and the end of the rocking distance are each limited by the blockade of at least one wheel. Further functional features of the pram or frame described above and below can be carried out as specific method steps.

In a particularly preferred embodiment of the invention, the power of the drive is increased after the start of the rocking distance and reduced before the end of the rocking distance. By this a smooth starting and braking of the pram is achieved and a jerky movement is avoided. The associated speed profile when rocking comes especially close to the manual rocking movement. The power of the drive can be reduced after 20%-80%, in particular 30%-60%, for example about 50% of the rocking distance.

If the power of the drive is reduced to zero after a holding time after the end of the rocking distance has been reached, the drive, in particular the motor of the drive, is safely in idleness before the reversal of direction is activated. This is particularly sensible when using an electric motor.

The safety during automatic rocking is further increased by the fact that the drive is switched off when the maximum rocking distance is exceeded by the pram. The maximum rocking distance corresponds at least essentially to the typical driving distance when the pram is moved back and forth by manual force. The maximum rocking distance is determined by the blockade of the at least one wheel at the beginning and end of the rocking distance. In addition to the safety provided by the limitation of the driving movement by the braking device, the power of the drive is switched off if an exceeding of the maximum rocking distance is detected (per se or by at least a predefined proportion of the rocking distance, e.g. 5%-50%).

Preferably, the power of the drive is changed reciprocally as the rocking distance is travelled so that the same or a similar speed profile is set in both driving directions during rocking.

In a further embodiment of the method, the length of the rocking distance can be adjusted or set to different sizes (whereby a maximum value can correspond to at least 2 times or at least 5 times a minimum value, for example). The length of the rocking distance can also be automatically set to shorter or longer rocking distances during a rocking period. From practical experience it is known that one pushes the pram sometimes back and forth for shorter or longer periods in order to calm the child, even during a rocking phase.

The above-mentioned features of the preferred embodiments of the method according to the invention can also be implemented by means of a corresponding configuration of the control unit in the embodiments of the pram according to the invention. In this respect, the above-mentioned method features are also disclosed and claimed in connection with a correspondingly configured control unit.

By that the suitability of the control unit to perform the desired functions is claimed. For example, the control unit is configured in such a way that the length of the rocking distance is adjustable or can be adjusted to different sizes. The length of the rocking distance can automatically be set to shorter or longer rocking distances during a rocking period. The same applies to the other process features also.

The parameters of the control of the rocking function mentioned below can be adjustable and/or can be set to different sizes.

According to embodiment, various parameters can be defined to control the rocking function, in particular:

a predefined proportion of the rocking distance, whereby the predefined proportion of the rocking distance can be 20%-80%, in particular 30%-60%, for example about 50% of the rocking distance; and/or a reduced motor power, wherein the reduced motor power can be less than 30% of the maximum motor power, preferably less than 20%, e.g. 5%-15% of the maximum motor power.

A frequency at which the sensors operate can be 10 Hz-200 Hz, preferably 20 Hz-100 Hz, e.g. 50 Hz. This means that the respective sensor detects a new value every 5 ms-100 ms, preferably every 10 ms-50 ms, e.g. every 20 ms. It may be provided that different sensors operate at different frequencies.

It can be provided that the rocking function can be operated in different modes, whereby the modes can differ, for example, by the frequency of the rocking function. In particular, different modes can be assigned different increases in power after the start of the rocking distance, and/or different modes can be assigned different predefined proportions of the rocking distance, whereby after reaching the latter the power of the drive is reduced. Specifically, two to five, e.g. three different modes may be provided.

It may be provided to let the motor power increase continuously (possibly linearly) after the start of the rocking distance until the predefined proportion of the rocking distance has been travelled. Furthermore, it may be provided to abruptly restrict the motor power to the reduced motor power when the predefined proportion of the rocking distance has been travelled. It may also be provided to maintain the reduced motor power at a constant level until the end of the rocking distance.

The motor power available for the rocking function can be limited to a preset proportion of the maximum motor power, preferably more than 50% of the maximum motor power, e.g. 70%-80% of the maximum motor power. It may be provided to provide only the reduced motor power when the motor power available for the rocking function is reached or exceeded, even if the predefined proportion of the distance has not yet been travelled.

The length of the rocking distance can be less than 20 cm, preferably less than 10 cm. Additionally or alternatively, the length of the rocking distance can be more than 0.5 cm, preferably more than 1 cm. Specifically, the length of the rocking distance can be in the range between 2 cm and 7 cm.

The rotation of the wheel braked by the braking device can be limited to at most 90° or at most 50°, preferably at most 30°. It can be provided that for the wheel braked by the braking device a rotation by at least 1° or at least 2°, preferably at least 4° is possible.

It may be provided that (after the predefined proportion of the rocking distance has been travelled) the reduced motor power is provided until a sensor detects that there is no motor movement (possibly that no motor movement has taken place for a predetermined time, e.g. 50 ms-250 ms, whereby the predetermined time may correspond to the holding time).

The duration of a full cycle (i.e. running through the rocking distance twice, namely once “there” and once “back”) can be in the range between 0.2 seconds and 10 seconds, preferably between 0.5 seconds and 5 seconds.

It may be possible that a user may switch the rocking function on and off directly on the motor as well as set it if necessary, but preferably this is possible via a operating unit provided on the slider and/or via an app. A wired and/or, in particular, a wireless connection may be provided for this purpose.

The invention is explained in more detail by means of an embodiment example with reference to the attached schematic figures with further details.

In these show

Figure 2:
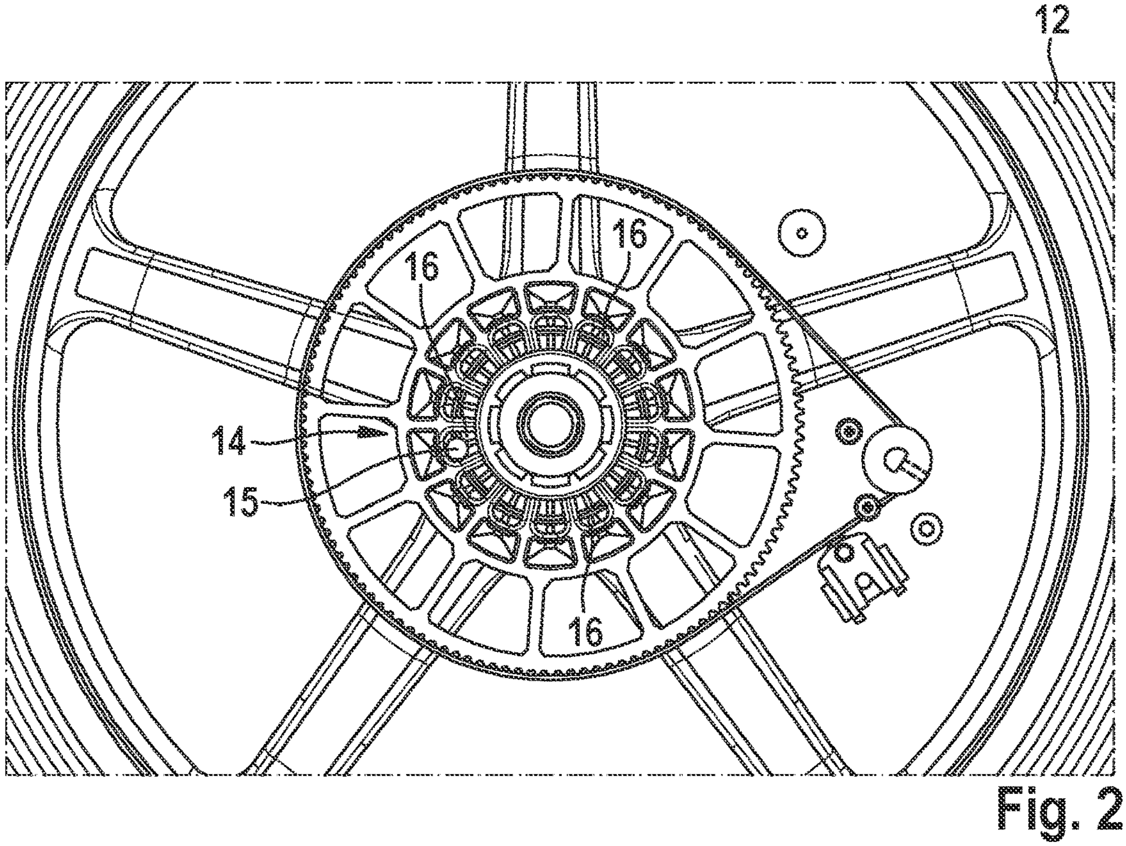
Figure 3:
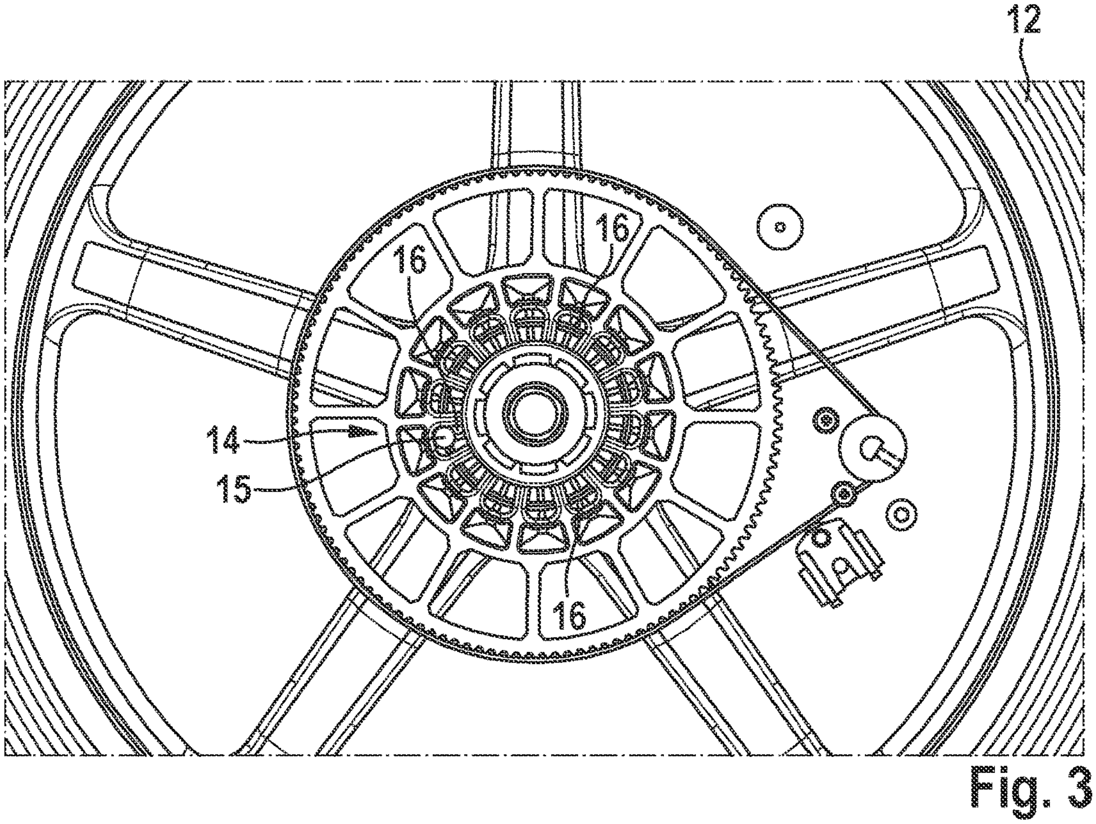

FIG. 1 an example of the structure of a pram with drive for pushing support according to the prior art;

FIG. 2 a top view of a braked wheel with a braking device of a pram according to an embodiment example according to the invention in a first position;

FIG. 3 the braking device according to FIG. 2 in a second position and

Figure 4:
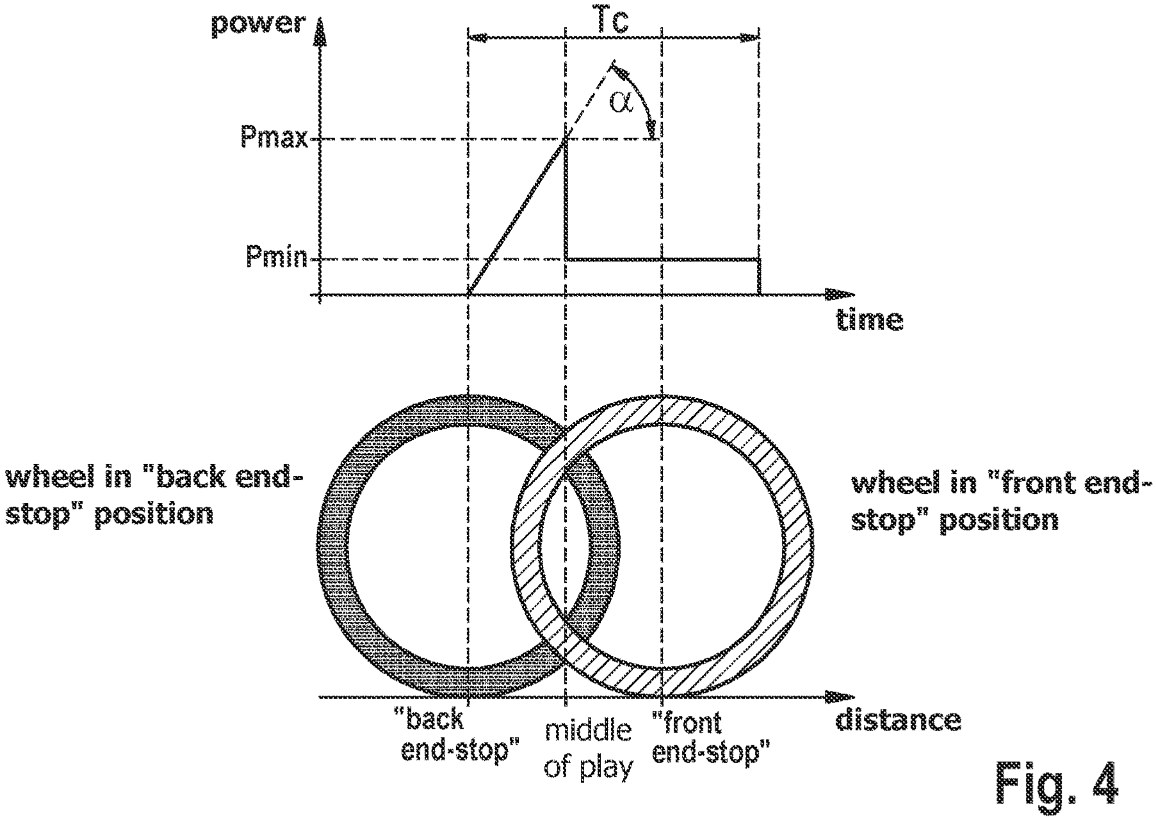

FIG. 4 the power curve of the drive in relation to the wheel position of a pram according to an embodiment example according to the invention.

FIG. 1 shows a pram according to the prior art with a drive 13, which is arranged in the lower area of the frame 10 of the pram. The invention is applicable to such a pram and enables the implementation of an automatic rocking function using the drive 13, which is additionally provided in the known pram to support the pushing function. The basic construction of the pram according to the embodiment example according to the invention is described with reference to the known pram, which otherwise does not show the rocking function in conjunction with the extended braking function.

The invention or the embodiment examples according to the invention use the drive 13 provided to support the pushing function additionally to realise the automatic rocking functions. Instead of this dual function of the drive 13, a separate drive can be provided for the rocking function. In contrast, the dual function has the advantage that the pram is built compactly and lightweight, as the number of drives 13 is reduced. The drive 13 can be actuated accordingly for the automatic rocking function of the pram. The actuation of the drive 13 can be done by a corresponding control unit. In any case, the drive 13 is designed such that upon actuation of the drive 13, the rocking function takes place automatically, i.e. without manual intervention. To this end, the drive 13 enables an automatic reversal of the direction of travel, as when rocking a pram by manual application of force.

In the pram according to FIG. 1, the drive 13 comprises a hub motor which is drive-connected to at least one of the rear wheels 12. Other motors and motor arrangements are possible. The frame 10 comprises a pusher 11 with a handle as well as wheels 12, which are rotatably connected to the frame 10. Here too, different designs of the frame 10 are possible, for example designs with three or four wheels. The invention is not limited to a specific configuration of the frame 10.

The drive 13 comprises a motor 17, for example an electric motor, an energy source such as a battery or an accumulator, one or more detection units (sensors) and/or a control. The energy source, the sensors or the control are not shown in FIG. 1. The sensors can be designed to detect a rotation of the at least one braked wheel 12, in particular to measure an angle of rotation of the braked wheel 12. Preferably, the sensors can additionally detect a rotation of the motor 17. With the aid of a further sensor it can monitored whether the braking device 14, in particular the parking brake, is activated. This serves the purpose of safety, as the rocking function is prevented in the case of not-activated parking brake. Alternatively or in addition to this safety, the speed of the pram or other corresponding parameters can be measured in order to prevent the rocking function from being triggered upon driving of the pram.

The mounting unit 18 is used to mount a baby or small child and is connected to the frame 10, for example by an adapter or permanently connected. The mounting unit 18 is preferably designed as a reclining unit, in particular as a carrycot and/or infant carrier. Seat attachments, which can be moved into a reclining position if necessary, are also possible.

The control unit, not shown in FIG. 1, is designed for the analysation of the data detected by the sensors and, based on this, for the control of the drive unit 13, in particular the motor 17. Also not shown in FIG. 1 is the braking device 14 shown in FIGS. 2, 3, which can be transferred into a driving state and into a braked state. In the driving state, the braking device 14 is released and allows a free rotation of the wheels so that the pram can be pushed unhindered. In the braked state of the braking device 14, at least one wheel 12 is braked. Preferably, the braking device 14 and the drive 13 act on one and the same wheel 12. The braking device 14 of the pram has so much play that a linear movement or a back and forth movement of the pram is possible, which essentially corresponds to a manual rocking movement. For this purpose, the wheel 12 braked by the braking device 14 can be rotated to a limited extent in both wheel circumferential directions in the braked state.

FIGS. 2, 3 show an embodiment example of the pram according to the invention or the frame for a pram according to the invention, in which the braking device 14 is constructed in such a way that rotation of the wheel, in particular of the driven wheel 12, is enabled to a limited extent in the braked state (partial rotation). For this purpose, the braking device 14 has an engagement means 15, which in the embodiment example according to FIG. 2 is designed as a stud or pin 15. The pin 15 extends parallel to the hub axis of the wheel 12 and projects outwards in relation to the frame 10 in order to be able to interact with a complementary engagement opening 16 of the wheel 12. The engagement opening 16 is designed as a pin receptacle for the pin 15.

The braking device 14 is therefore a parking brake because the pin 15 in the pin receptacle or engagement opening 16 blocks a rotation of the wheel 12.

A comparison of FIGS. 2 and 3 shows that the pin 15 assumes different positions relative to the wheel 12 or to the engagement opening 16. The different positions of the pin 15 illustrate the braking play of the braking device 4, which is used in the embodiment example according to FIGS. 2 and 3 to implement the automatic, motorised rocking function of the pram.

In FIG. 2, the pin 5 is in the lower position and butts on a first inner side of the engagement opening 16. By this a rotation of the wheel 12 in a clockwise direction (in the view shown in FIG. 2) is prevented. FIG. 3 shows the upper position of the pin 15 in the engagement opening 16, in which the pin 15 butts on a second inner side of the engagement opening 16. By this a movement of the wheel 16 in an anti-clockwise direction is prevented. The first and second inner sides of the engagement opening 16 are arranged opposite each other in the circumferential direction of the wheel 12, so that a sufficiently large free space of the engagement opening 16 is formed between the two inner sides, in which the pin 15 can perform the desired partial rotation relative to the wheel 12 or vice versa.

In other words, the length of the engagement opening 16 extending in the circumferential direction is greater than the diameter of the pin 15. The first and second inner sides of the engagement opening 16, which determine the partial rotation of the wheel 12 in the braked state, are spaced apart that far from one another that the desired rocking distance of the pram for the rocking movement can be travelled.

The width of the engagement opening 16 extends in the radial direction of the wheel 12. The width of the engagement opening 15 corresponds to at least the diameter of the pin 15 or is greater than this.

According to embodiment, the pin 15 can be brought into at least two positions in a direction perpendicular to the drawing plane of FIGS. 2 and 3, namely into a first position in which it engages in one of the engagement openings 16 and into a second, retracted position in which it is out of engagement with the engagement openings 16.

The shape of the engagement opening 16 is not limited to the contour shown in FIGS. 2, 3. Other shapes are possible.

In FIGS. 2, 3 it is readily recognizable that several engagement openings 16 are arranged around the circumference of the wheel, which are identically designed so that there are various engagement possibilities for the pin 15. The rocking function is possible in any position due to the matching brake play or the identical length of the engagement openings 16.

The mode of operation of the embodiment example according to FIG. 2 and FIG. 3 is explained using the graph in FIG. 4. FIG. 4 illustrates the interaction of the drive 13 and the braking device 14.

The upper partial figure in FIG. 4 exemplarily shows the power curve of the drive 13 or of the motor 17 over time in the braked state and during automatic rocking. The lower partial figure in FIG. 4 shows the corresponding wheel positions of the wheel 12 in the braked state during the rocking movement. The centres of the two wheel positions correspond to the maximum rocking distance, i.e. the linear movement of the pram when moving back and forth. The two maximum wheel positions are defined by the braking device 4, which limit the start and the end of the partial rotation of the wheel 12 shown in the lower partial figure of FIG. 4. In the left-hand position of the wheel 12 in FIG. 4, the pin 15 according to FIG. 3 butts on one inner surface of the engagement opening 16, so that a further movement of the wheel 12 is prevented (back end stop). The same applies to the other wheel position (front end-stop) in FIG. 4, which is defined by the stop of the pin 15 on the other inner surface of the engagement opening 16.

The upper partial figure in FIG. 4 shows the power curve of the drive 13 or of the motor 17, which determines the speed profile of the wheel movement. After the start of the rocking distance, the power initially increases with the gradient alpha to a maximum value Pmax, e.g. to 70% of the total motor power. The maximum value Pmax is reached after approximately half of the rocking distance, as can be seen from the comparison with the lower partial figure according to FIG. 4. Other times are possible. After reaching the maximum power Pmax, this drops to the minimum value Pmin, e.g. to 7% of the total motor power, which is kept constant until the end of the rocking distance, so that the rocking movement is gently slowed down by the pin 15 butting on the inside of the engagement opening 16. The power is maintained on the minimum value Pmin during a holding time beyond the butting-on of the pin 15 on the inner surface of the engagement opening 16 in order to achieve that the motor 17 stops before the reversal of movement is initiated.

The time Tc between the start of the power increase and the end of the holding time defines a rocking phase, in the example according to FIG. 4 a forward movement of the pram. The incline alpha and the time Tc of the rocking phase together influence the rocking movement. The greater the incline and the shorter the time Tc, the stronger the rocking movement. For the entire rocking process, the direction of force is reversed or the direction of rotation of the motor is changed after the end of the holding time, so that a reciprocal movement takes place, which results in a backward movement of the pram. In this, the power of the motor runs through the same course as shown in FIG. 4, but in the opposite direction. The rocking movement is therefore determined overall by the interaction of the braking device 4 in the braked state on the one hand and the drive 13 or the power curve of the motor 17 over time on the other. By the decoupling of the deceleration by the braking device 4 on the one hand and the movement of the wheel 16 by the drive 13 on the other, the process control is improved in addition to the safety during the automatic rocking, because the motor 17 is activated beyond the stop of the braking device 4 in order to achieve a safe reversal of movement.

The method according to the example embodiment shown can comprise the following steps:

1. switching on the rocking function (by switch or via app)
2. detecting whether the parking brake is active (if not: cancellation)
3. applying a force to the at least one wheel via the motor, (possibly linear) increase in motor power
4. detect how far the wheel has turned (with a sufficiently high frequency, e.g. 20 Hz-100 Hz)
5. when the desired proportion (20%-80%, preferably 30%-60%, e.g. 50%) of the predefined rotation is reached, the motor power is reduced (to a predefined value that can be less than 50%, preferably less than 30% of the maximum motor power, e.g. 7% or 15%)
6. maintaining the reduced motor power until the motor stops rotating (because according to the embodiment the pin butts on the end of the hole)
7. applying a force to the at least one wheel (in comparison to 3. in the opposite direction) by the motor, (possibly linear) increase in motor power
8. steps 4-6, then continue with 3
9. cancellation by an event from the following list: (it is not necessary for all the cancellation criteria mentioned to be implemented)
   a. switching off of the rocking function
   b. deactivation of the parking brake
   c. rotation exceeds predetermined value, in particular more than 100% of the predefined rotation, e.g. 120% or 150% d. energy of the energy source drops to or below predefined value.

According to embodiment, the motor power in 3. or 7. can be limited to a predefined value (in particular >50% of the maximum motor power and/or <90% of the maximum motor power), for example 60%-80%, e.g. 70% or 75%.

According to embodiment, in 6. the reduced motor power can still be maintained for a predefined time (holding time).

At this point, it should be pointed out that all of the parts described above are claimed to be essential to the invention when viewed individually and in any combination, in particular the details shown in the drawings. Modifications thereof are familiar to the skilled person.

Furthermore, it is pointed out that a scope of protection as broads as possible is sought. In this respect, the disclosure contained in the claims can also be specified by features that are described with further features (even without these further features necessarily being included). It is explicitly pointed out that round brackets and the term "in particular" are intended to emphasise the optionality of features in the respective context, which does not mean, conversely, that a feature is to be regarded as mandatory in the corresponding context without such identification.

Reference Signs

10 frame
11 pusher
12 wheels
13 drive
14 braking device
15 engagement means
16 engagement opening
17 motor
18 mounting unit

The invention claimed is:

1. A pram with a frame which has a pusher and wheels for driving the pram, a drive which is drive-connected to at least one of the wheels, and a braking device for at least one of the wheels, which is transferable into a driving state with free wheel rotation and into a braked state with the at least one wheel being braked by the braking device, wherein the pram comprises a sensor for detecting the braked state of the braking device, and a control unit, wherein the control unit is configured to actuate the drive for an automatic rocking function of the pram only after the sensor has detected the braked state of the braking device, and wherein the at least one wheel being braked by the braking device can be rotated to a limited extent in both wheel circumferential directions in the braked state for automatic rocking of the pram, wherein the control unit is further configured to at least one of:

increase a power of the drive to a maximum value after a beginning of a rocking distance and reduce the power of the drive to a minimum value before an end of the rocking distance and maintain the power of the drive at the minimum value, reduce the power of the drive after 20%-80% of the rocking distance to a value larger than 0, and switch off the power of the drive when a maximum rocking distance is exceeded per se or by at least a predefined portion of the rocking distance.

2. The pram according to claim 1, wherein the braking device comprises a parking brake.

3. The pram according to claim 1, wherein the braking device has several braking positions with each of the braking positions being at different wheel angle positions, each of which enables the limited extent of rotation, which is limited in both wheel circumferential directions, of the braked wheel.

4. The pram according to claim 1, wherein the braking device has at least one of an engagement means and an engagement recess, which interacts with a corresponding engagement opening or a corresponding engagement means of the respective wheel for braking.

5. The pram according to claim 4, wherein an inner circumference of the engagement recess, is larger than an outer circumference of the engagement means in order to form a play in the wheel circumferential direction.

6. The pram according to claim 4, wherein the engagement means comprises a pin and the engagement recess, comprises a corresponding pin receptacle, wherein the pin receptacle has a length which is greater than a diameter of the pin.

7. The pram according to claim 6, wherein the pin receptacle extends in a longitudinal direction along a partial circumference of the at least one wheel.

8. The pram according to claim 1, wherein the drive has at least one of a motor and an energy source.

9. The pram according to claim 8, wherein the motor is arranged on a rear axle of the frame or is a hub motor.

10. The pram according to claim 8, wherein the drive or a part of the drive is a removable module.

11. The pram according to claim 8, wherein the control unit is designed for analysing detected data and controlling the motor.

12. The pram according to claim 8, wherein the control unit is configured in such a way that a braked state of the pram is detected, upon actuation of the rocking function a rocking distance of the pram is automatically moved back and forth by the drive, and a beginning and an end of the rocking distance are each limited by a blockade of at least one wheel.

13. The pram according to claim 12, wherein the control unit is configured in such a way that a power of the drive is reduced after 30%-60% of the rocking distance to a value larger than zero.

14. The pram according to claim 12, wherein the control unit is configured in such a way that a power of the drive is changed reciprocally each time the rocking distance is travelled.

15. A frame for a pram, which has a pusher and wheels for driving the frame, a drive which is drive-connected to at least one of the wheels, and a braking device for at least one of the wheels, which is transferable into a driving state with free wheel rotation and into a braked state with the at least one wheel being braked by the braking device, wherein the frame comprises a sensor for detecting the braked state of the braking device, and a control unit, wherein the control unit is configured to actuate the drive for an automatic rocking function of the frame only after the sensor has detected the braked state of the braking device, wherein the at least one wheel being braked by the braking device is rotatable to a limited extent in both wheel circumferential directions in the braked state for automatic rocking of the frame, wherein the control unit is configured to at least one of:

increase a power of the drive to a maximum value after a beginning of a rocking distance and reduce the power of the drive to a minimum value before an end of the rocking distance and maintain the power of the drive at the minimum value, reduce the power of the drive after 20%-80% of the rocking distance to a value larger than 0, and switch off the power of the drive when a maximum rocking distance is exceeded per se or by at least a predefined portion of the rocking distance.

16. A method for automatically rocking a pram with a rocking function, wherein the pram comprises at least one wheel, a braking device for braking the at least one wheel, a drive, a sensor, and a control unit, the method comprising:

detecting, by the sensor, a braked state of the pram in which the device brakes the at least one wheel, actuating, by the control unit, the rocking function only after the sensor has detected the braked state, whereby a rocking distance of the pram is automatically moved back and forth by a drive, and wherein a beginning and an end of the rocking distance are each limited by a blockage of the at least one wheel, and wherein the control unit is configured to at least one of:

increase a power of the drive to a maximum value after the beginning of the rocking distance and reduce the power of the drive to a minimum value before the end of the rocking distance and maintain the power of the drive at the minimum value, reduce the power of the drive after 20%-80% of the rocking distance to a value larger than 0, and switch off the power of the drive when a maximum rocking distance is exceeded per se or by at least a predefined portion of the rocking distance.

17. The method according to claim 16, wherein the power of the drive is reduced after 30%-60% of the rocking distance to a value larger than zero.

18. The method according to claim 16, wherein a power of the drive is reduced to zero after a holding time after the end of the rocking distance has been reached.

19. The method according to claim 16, wherein a power of the drive is changed reciprocally each time the rocking distance is travelled.

20. The method according to claim 16, wherein a length of the rocking distance is adjusted or set to different sizes.

21. The method according to claim 16, wherein a length of the rocking distance is automatically adjusted to shorter or longer rocking distances during a rocking period.

* * * * *